United States Patent
Kim et al.

(10) Patent No.: US 11,280,901 B2
(45) Date of Patent: Mar. 22, 2022

(54) VEHICLE AND METHOD OF CONTROLLING THE SAME

(71) Applicants: HYUNDAI MOTOR COMPANY, Seoul (KR); KIA MOTORS CORPORATION, Seoul (KR); HYUNDAI AUTRON CO., LTD., Seongnam-si (KR)

(72) Inventors: Ho-Jun Kim, Seoul (KR); Changwoo Ha, Seoul (KR); Byung-Jik Keum, Seoul (KR); Jun-Muk Lee, Seongnam-si (KR); Joo-Hee Choi, Yongin-si (KR); Jinha Choi, Suwon-si (KR)

(73) Assignees: HYUNDAI MOTOR COMPANY, Seoul (KR); KIA MOTORS CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 351 days.

(21) Appl. No.: 16/514,198

(22) Filed: Jul. 17, 2019

(65) Prior Publication Data
US 2020/0191950 A1    Jun. 18, 2020

(30) Foreign Application Priority Data
Dec. 18, 2018   (KR) ........................ 10-2018-0164119

(51) Int. Cl.
*G01S 13/931*   (2020.01)
*B60T 7/22*   (2006.01)

(52) U.S. Cl.
CPC .............. *G01S 13/931* (2013.01); *B60T 7/22* (2013.01); *G01S 2013/932* (2020.01);
(Continued)

(58) Field of Classification Search
CPC . B60R 1/00; B60R 2300/802; B60R 21/0136; B60W 30/095; B60W 40/02;
(Continued)

(56) References Cited

U.S. PATENT DOCUMENTS 10,007,269 B1 *   6/2018   Gray .................. G06K 9/00805
10,195,992 B2 *   2/2019   Gerardo Castro .... G01S 7/4808
(Continued)

FOREIGN PATENT DOCUMENTS

KR        20130017497 A   *   2/2013

*Primary Examiner* — Marthe Y Marc-Coleman
(74) *Attorney, Agent, or Firm* — McDonnell Boehnen Hulbert & Berghoff LLP

(57) ABSTRACT

Provided is a vehicle capable of efficient storage medium management by differentially storing images acquired by the vehicle on the basis of a surrounding environment of the vehicle and a vehicle state, and a control method thereof. The vehicle includes a storage, a camera configured to acquire a vehicle surrounding image of a vehicle, a sensor unit configured to acquired vehicle information of the vehicle, and a control unit configured to determine an accident occurrence probability of an accident occurring to the vehicle on the basis of at least one of the vehicle surrounding image and the vehicle information, and in response to determining that a collision has occurred to the vehicle on the basis of the vehicle information, determine a storage form of the vehicle surrounding image on the basis of the accident occurrence probability and store the vehicle surrounding image in the storage.

12 Claims, 12 Drawing Sheets

(52) U.S. Cl.
CPC .......... *G01S 2013/9318* (2020.01); *G01S 2013/9319* (2020.01); *G01S 2013/9325* (2013.01); *G01S 2013/93185* (2020.01); *G01S 2013/93271* (2020.01); *G01S 2013/93272* (2020.01); *G01S 2013/93274* (2020.01)

(58) Field of Classification Search
CPC .......... B60W 2420/42; G01S 13/865; G01S 13/931; G01S 13/867; G01S 17/931; G01S 2013/932; G01S 2013/93271; G01S 2013/9318; G01S 2013/93274; G01S 2013/93185; G01S 2013/9319; G01S 2013/93272; G01S 2013/9325; B60T 7/22; G07C 5/0866; G07C 5/02; B62D 41/00
See application file for complete search history.

(56) References Cited

U.S. PATENT DOCUMENTS

2019/0031189 A1\* 1/2019 Patana ................ B60W 30/095
2019/0354786 A1\* 11/2019 Lee ...................... G05D 1/0088

\* cited by examiner

VEHICLE AND METHOD OF CONTROLLING THE SAME

CROSS REFERENCE TO RELATED APPLICATION

This application is based on and claims priority under 35 U.S.C. § 119 to Korean Patent Application No. 10-2018-0164119, filed on Dec. 18, 2018 in the Korean Intellectual Property Office, the disclosure of which is incorporated herein by reference.

BACKGROUND

1. Field

The present disclosure relates to a vehicle for efficiently managing an image acquired by the vehicle and a method of controlling the same.

2. Description of the Related Art

Currently, vehicles acquire surrounding images of the vehicle using sensors provided on the periphery of the vehicle. The sensors may include a camera, a radar, a lidar, and the like.

In detail, more and more vehicles are using a blind spot monitoring apparatus that is installed on front and rear sides of the vehicle so that the driver can easily check a blind spot during operation of the vehicle. Such an apparatus for checking a blind spot is generally implemented as a system that captures front view and rear view images using cameras, and allows the captured images to be viewed through a monitor using an audio/video (A/V) system provided inside the vehicle.

In addition, there has been recent development and commercialization on a vehicle image recording apparatus (digital video recorder: DVR) that is installed inside a vehicle to record an external image of the vehicle, such that the cause of a traffic accident is identified.

However, when the surrounding images of the vehicle are continuously stored, the capacity of a storage medium provided in the vehicle becomes insufficient. When the storage period for storing surrounding images of the vehicle is set to be long, it may be difficult to acquire surrounding images as needed, for example, in a case when an accident occurs.

SUMMARY

Therefore, it is an object of the present disclosure to provide a vehicle capable of efficiently managing a storage medium by storing images acquired by the vehicle to differ in quality on the basis of a surrounding environment of the vehicle and a vehicle state, and a method of controlling the same.

Additional aspects of the disclosure will be set forth in part in the description which follows and, in part, will be obvious from the description, or may be learned by practice of the disclosure.

Therefore, it is an aspect of the present disclosure to provide a vehicle including: a storage unit; a camera configured to acquire a vehicle surrounding image of a vehicle; a sensor unit configured to acquire vehicle information of the vehicle; and a control unit configured to determine an accident occurrence probability of the vehicle on the basis of at least one of the vehicle surrounding image and the vehicle information, and in response to determining that a collision has occurred to the vehicle on the basis of the vehicle information, determine a storage form of the vehicle surrounding image on the basis of the accident occurrence probability and store the vehicle surrounding image in the storage unit.

The control unit may be configured to: determine a positional relation between the vehicle and a surrounding object of the vehicle on the basis of the vehicle information; and determine the accident occurrence probability of the vehicle on the basis of the positional relationship.

The control unit may be configured to: determine driving state information of the vehicle on the basis of the vehicle information; and determine the accident occurrence probability of the vehicle on the basis of the driving state information.

The control unit may be configured to: determine a complexity of the vehicle surrounding image on the basis of at least one object included in the vehicle surrounding image; and determine the accident occurrence probability of the vehicle on the basis of the complexity of the vehicle surrounding image.

The control unit may be configured to: identify a terrain area in which the vehicle travels in the vehicle surrounding image to segment a vehicle surrounding object from the terrain area; and store a part of the vehicle surrounding image corresponding to an area of the vehicle surrounding object and a part of the vehicle surrounding image corresponding to the terrain area to be different in storage forms in the storage unit.

The control unit may be configured to: determine a complexity of the terrain area on the basis of a pixel distribution per unit area included in the part of the vehicle surrounding image corresponding to the terrain area; and determine a storage form of the part of the vehicle surrounding image corresponding to the terrain area on the basis of the complexity of the terrain area.

The control unit may be configured to: store the vehicle surrounding image in the storage form that is determined by a number of frames per unit time in proportion to the accident occurrence probability.

It is another aspect of the present disclosure to provide a method of controlling a vehicle, the method including: acquiring a vehicle surrounding image of a vehicle; acquiring vehicle information; determining an accident occurrence probability of the vehicle on the basis of at least one of the vehicle surrounding image and the vehicle information; and in response to determining that a collision has occurred to the vehicle on the basis of the vehicle information, determining a storage form of the vehicle surrounding image on the basis of the accident occurrence probability of the vehicle, and storing the vehicle surrounding image in a storage unit.

The determining of the accident occurrence probability of the vehicle may include: determining a positional relation between the vehicle and a surrounding object of the vehicle on the basis of the vehicle information; and determining the accident occurrence probability of the vehicle on the basis of the positional relationship.

The determining of the accident occurrence probability of the vehicle may include: determining driving state information of the vehicle on the basis of the vehicle information; and determining the accident occurrence probability of the vehicle on the basis of the driving state information.

The determining of the accident occurrence probability of the vehicle may include: determining a complexity of the vehicle surrounding image on the basis of at least one object included in the vehicle surrounding image; and determining the accident occurrence probability of the vehicle on the basis of the complexity of the vehicle surrounding image.

The method may further include: identifying a terrain area in which the vehicle travels in the vehicle surrounding image to segment a vehicle surrounding object from the terrain area; and storing a part of the vehicle surrounding image corresponding to an area of the vehicle surrounding object and a part of the vehicle surrounding image corresponding to the terrain area to be different in storage forms in the storage unit.

The storing of the part of the vehicle surrounding image corresponding to the terrain area may include: determining a complexity of the terrain area on the basis of a pixel distribution per unit area included in the part of the vehicle surrounding image corresponding to the terrain area; and determining a storage form of the part of the vehicle surrounding image corresponding to the terrain area on the basis of the complexity of the terrain area.

The determining of the storage form of the vehicle surrounding image and storing the vehicle surrounding image in the storage unit may include: storing the vehicle surrounding image in the storage form that is determined by a number of frames per unit time in proportion to the accident occurrence probability.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Figure 1:
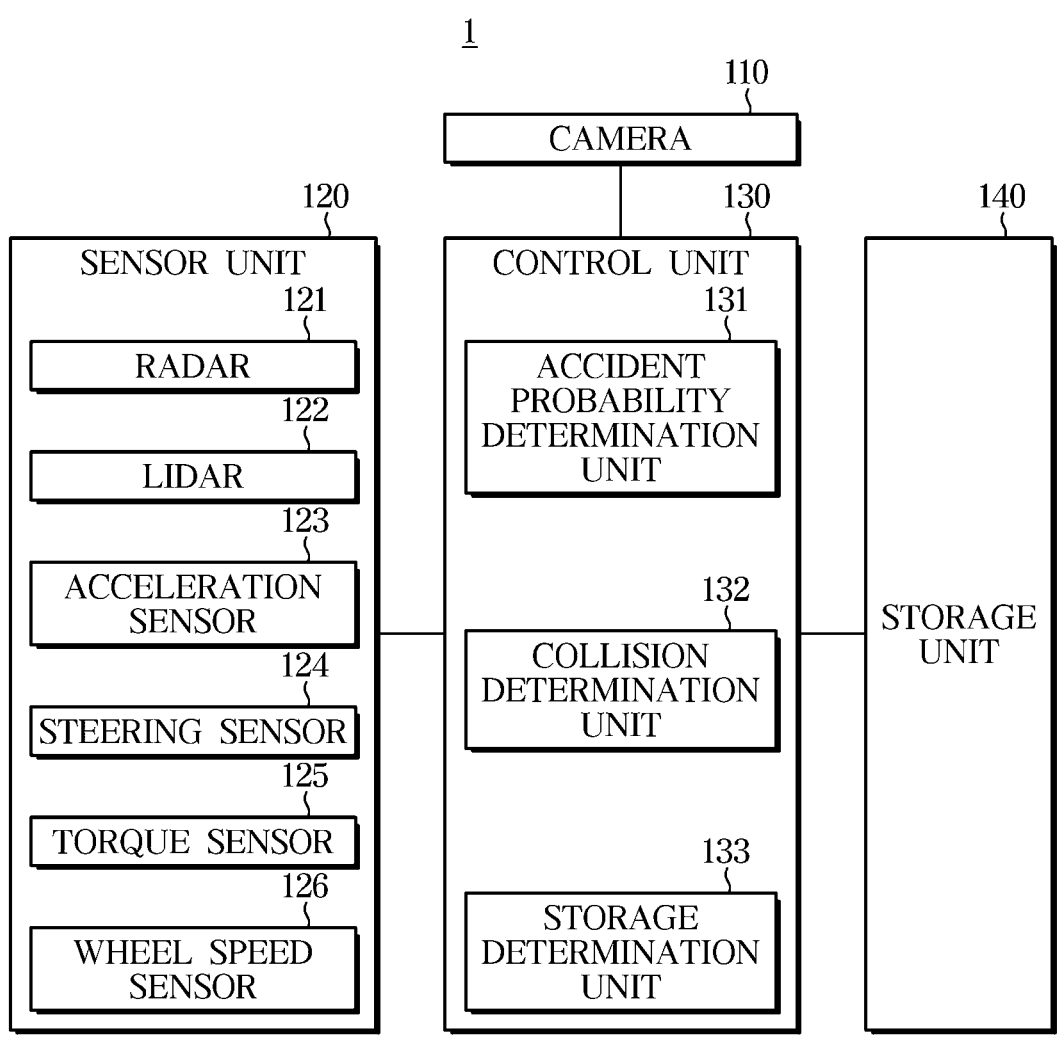
FIG. 1 is a control block diagram illustrating a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "part", "module", "member", "block", etc., may be implemented in software and/or hardware, and a plurality of "parts", "modules", "members", or "blocks" may be implemented in a single element, or a single "part", "module", "member", or "block" may include a plurality of elements.

It will be further understood that the term "connect" or its derivatives refer both to direct and indirect connection, and the indirect connection includes a connection over a wireless communication network. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that one member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise. Reference numerals used for method steps are just used for convenience of explanation, but not to limit an order of the steps. Thus, unless the context clearly dictates otherwise, the written order may be practiced otherwise.

Hereinafter, the operating principles and embodiments of the disclosure will be described with reference to the accompanying drawings.

FIG. 1 is a control block diagram illustrating a vehicle 1 according to an embodiment.

Referring to FIG. 1, the vehicle 1 according to the embodiment may include a camera 110, a sensor unit 120, a control unit 130, and a storage unit 140.

The camera 110 may acquire surrounding images of the vehicle 1.

The camera 110 may be provided on the front, rear, and lateral sides of the vehicle 1 to acquire images.

The camera 110 installed in the vehicle may include a charge-coupled device (CCD) camera 110 or a complementary metal-oxide semiconductor (CMOS) color image sensor. Here, the CCD and the CMOS refer to a sensor that converts light received through a lens of the camera 110 into an electric signal. In detail, the CCD camera 110 refers to a device that converts an image into an electric signal using a charge-coupled device. In addition, a CMOS image sensor (CIS) refers to a low-consumption and low-power type image pickup device having a CMOS structure, and serves as an electronic film of a digital device. In general, the CCD has a superior sensitivity compared to the CIS and thus is widely used in the vehicle 1, but the present disclosure is not limited thereto.

The sensor unit 120 may be implemented as a configuration for acquiring vehicle information. The vehicle information may include vehicle outside information and vehicle inside information. The vehicle information may include information indicating a relationship between the vehicle 1 and an object located outside the vehicle 1. The vehicle information may include driving state information of the vehicle 1 including the acceleration, steering, and the like of the vehicle 1.

The sensor unit 120 may include a radar 121, a lidar 122, an acceleration sensor 123, a steering sensor 124, a torque sensor 125, and a wheel speed sensor 126.

The radar 121 may be implemented using a sensor module that emits electromagnetic waves in a wavelength range of microwaves (ultra-high frequency, 10 cm to 100 cm wavelengths) to an object and receives electromagnetic waves reflected from the object to identify the distance, direction and altitude and the like of the object.

The lidar 122 may be implemented using a sensor module that emits a laser pulse and receives the light, once being reflected from a surrounding object and returning thereto, to identify the distance to the object and the like so that the surrounding image is represented in detail.

The acceleration sensor 123 may be implemented using a three-axis sensor. The acceleration sensor 123 may be implemented to obtain acceleration information in the x-axis, y-axis, and z-axis directions when the vehicle 1 moves in a three dimensional space. The acceleration sensor 123 may be implemented using a gyro sensor. The type of the sensor is not limited as long as the sensor can calculate impact information of the vehicle 1.

The steering sensor 124 refers to a sensor that may obtain the angle at which a tire is actually rotated with respect to the turning angle of the steering wheel of the vehicle 1, and may be provided in an electric power steering (ESP) system.

The torque sensor 125 is a sensor that measures the overall torque of the vehicle 1. When the torque is measured, a power transmission shaft is coupled with a braking device and the work is dissipated in the form of heat or electric energy to produce a braking force, in which the torque is obtained from the braking force, or is obtained from a twist angle or deformation of the shaft.

The wheel speed sensor 126 is installed in each of four wheels, including front and rear wheels, so that the rotational speed of the wheel may be detected by a change in the magnetic line of force in a tone wheel and a sensor. According to one embodiment, the wheel speed sensor 126 may be provided in an electronic stability control (ESC) system.

The control unit 130 may determine an accident occurrence probability of the vehicle 1 on the basis of at least one of the surrounding image and the vehicle information. The accident occurrence probability may be determined in overall consideration of the positional relationship between the vehicle 1 and the surrounding object, and the driving state of the vehicle 1.

The control unit 130 is configured to, upon determining that a collision has occurred to the vehicle 1 on the basis of the vehicle information, determine a storage form of the vehicle surrounding image on the basis of the accident occurrence probability of the vehicle, and store the vehicle surrounding image in the storage unit 140.

With regard to the collision of the vehicle 1, the control unit 130 may determine that a collision has occurred to the vehicle 1 when the acceleration of the vehicle 1 obtained by the acceleration sensor described above exceeds a predetermined value. That is, since when the accident occurrence probability is high, the vehicle surrounding image having a high quality is required, the control unit 130 may store the vehicle surrounding image with a high quality in response to the accident occurrence probability being high and may store the vehicle surrounding image with a low quality in response to the accident occurrence probability being low.

The storage form of the surrounding image may be determined by the number of frames of an image per unit time. That is, an image including a large number of frames per unit time may be determined to be a high-quality storage form, and an image including a small number of frames per unit time may be determined to be a low-quality storage form.

Meanwhile, the determining of a storage form may be performed by a storage determination unit 133 provided in the control unit 130.

The control unit 130 may determine the positional relationship between the vehicle 1 and the surrounding object on the basis of the vehicle information and determine the accident occurrence probability of the vehicle 1 on the basis of the positional relationship. The positional relationship may include a distance, a direction and a relative speed between the vehicle 1 and an object.

In one embodiment, the control unit 130 may determine that the accident occurrence probability is high when the distance between the vehicle 1 and an object is close and the relative speed difference between the vehicle 1 and the object is great.

The control unit 130 may determine driving state information of the vehicle 1 on the basis of the vehicle information, and may determine the accident occurrence probability of the vehicle 1 on the basis of the driving state information. The driving state information may include the steering angle of the vehicle 1, the amount of change in the steering angle, the speed and acceleration of the vehicle 1, and the like.

According to one embodiment, when the amount of change in the steering angle of the vehicle 1 exceeds a predetermined value and the acceleration of the vehicle 1 exceeds a predetermined value, the vehicle 1 is not determined to perform a normal driving, and therefore, the control unit 130 determines that the accident occurrence probability is high.

The control unit 130 may determine a complexity of a vehicle surrounding image on the basis of at least one object included in the vehicle surrounding image, and determine the accident occurrence probability of the vehicle 1 on the basis of the complexity of the surrounding image.

Meanwhile, the determining of an accident occurrence probability may be performed by an accident probability determination unit 131 provided in the control unit 130.

In addition, the determining of whether a collision has occurred to the vehicle 1 may be performed by a collision determination unit 132 provided in the control unit 130.

In addition, the control unit 130 may also be configured to determine the accident occurrence probability on the basis of information derived from the functions of forward collision-avoidance assist (FCA) and blindspot collision-avoidance Assist (BCA) that perform collision avoidance through emergency automatic braking and steering according to the environment of the neighboring vehicle.

The complexity of the vehicle surrounding image may be determined by the distribution of pixels per unit area included in the vehicle surrounding image. That is, when the pixels included in a unit area included in a vehicle surrounding image are variously distributed, the control unit 130 may determine that various pieces of information are included in the unit area, so that the control unit 130 may determine that the complexity of the vehicle surrounding image is high, and when the pixels included in the unit area included in the vehicle surrounding image are distributed in a certain area, may determine that the complexity of the vehicle surrounding image is low.

The control unit 130 may identify a terrain area in which the vehicle 1 travels in the surrounding image, and store the terrain area in the storage unit 140 in a predetermined storage form.

The terrain area may refer to an area of a vehicle surrounding image except for a vehicle surrounding object.

In other words, the vehicle surrounding image acquired by the vehicle 1 may include a vehicle surrounding object around the vehicle 1, and the vehicle surrounding object has a high relevance to the accident occurrence probability in association with the vehicle 1, and therefore, the control unit 130 may store the vehicle surrounding object as a high quality image.

On the other hand, a terrain area except for the vehicle surrounding object has a low relevance to the accident occurrence probability in association with the vehicle 1, and therefore, the control unit 130 may store the terrain area as a low quality image.

The control unit 130 may store the image in the storage unit 140 in a storage form determined by the number of frames per unit time in proportion to the accident occurrence probability.

That is, since when the accident occurrence probability is high, a high quality surrounding image of the vehicle 1 is required, the control unit 130 may store the vehicle surrounding image in the storage unit 140 in a storage form having a large number of frames per unit time. On the other hand, since when the accident occurrence probability is low, a high-quality surrounding image of the vehicle 1 is less required, the control unit 130 may store the vehicle surrounding image in the storage unit 140 in a storage form having a small number of frames per unit time.

In addition, the above-described storage form is described as the number of frames per unit time, but the present disclosure is not limited, and the storage form may be implemented further considering the resolution, bit rate, and the like of the vehicle surrounding image.

At least one of the components may be omitted or added to correspond to the performances of the components of the vehicle 1 shown in FIG. 1. In addition, it should be understood that the positions of the components may be changed to correspond to the performance and structure of the system.

Meanwhile, the components shown in FIG. 1 refer to software components and/or hardware components, such as a field programmable gate array (FPGA) and an application specific integrated circuit (ASIC).

Figure 2A:
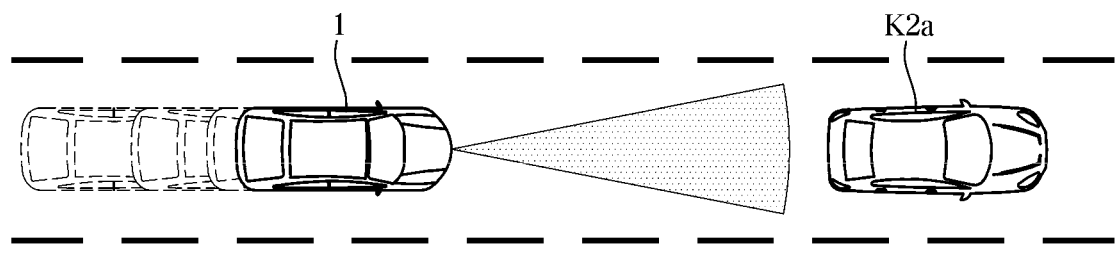
FIGS. 2A, 2B, and 2C are views illustrating a positional relationship between a vehicle and a surrounding object positioned at a front side of the vehicle and a driving state of the vehicle according to an embodiment.
Figure 2B:
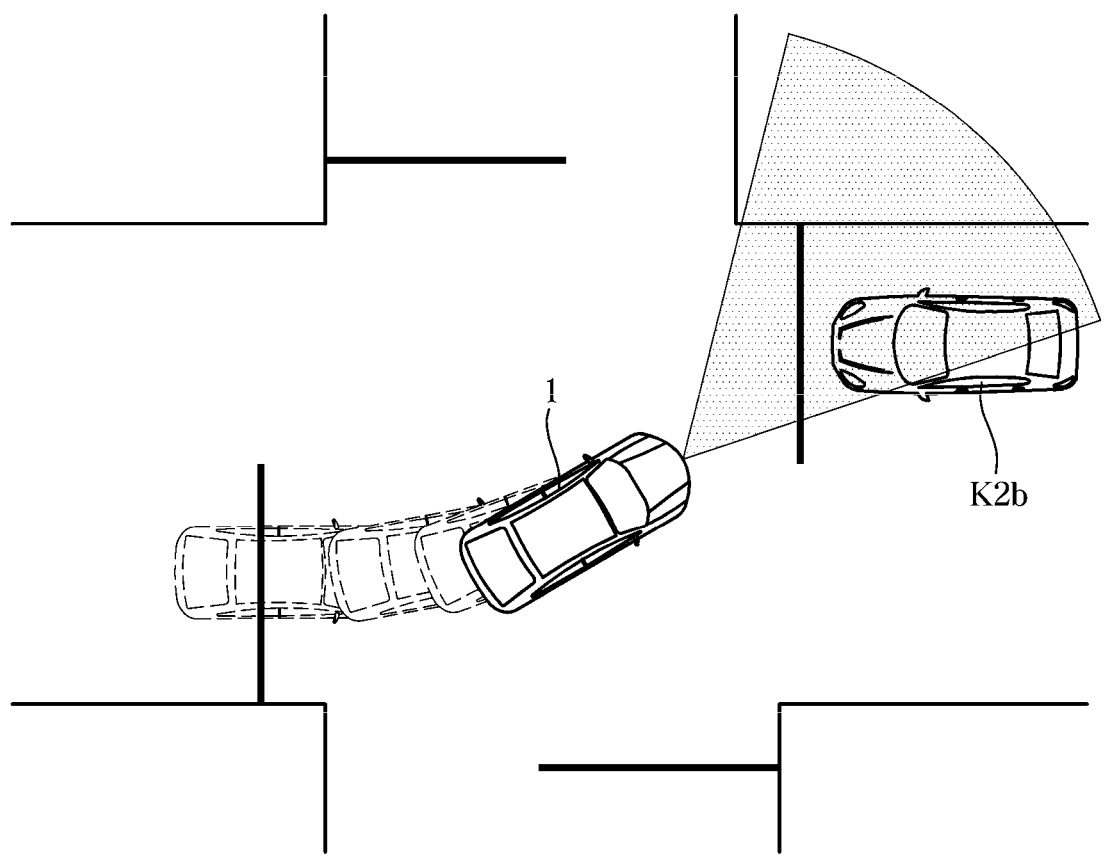
Figure 2C:
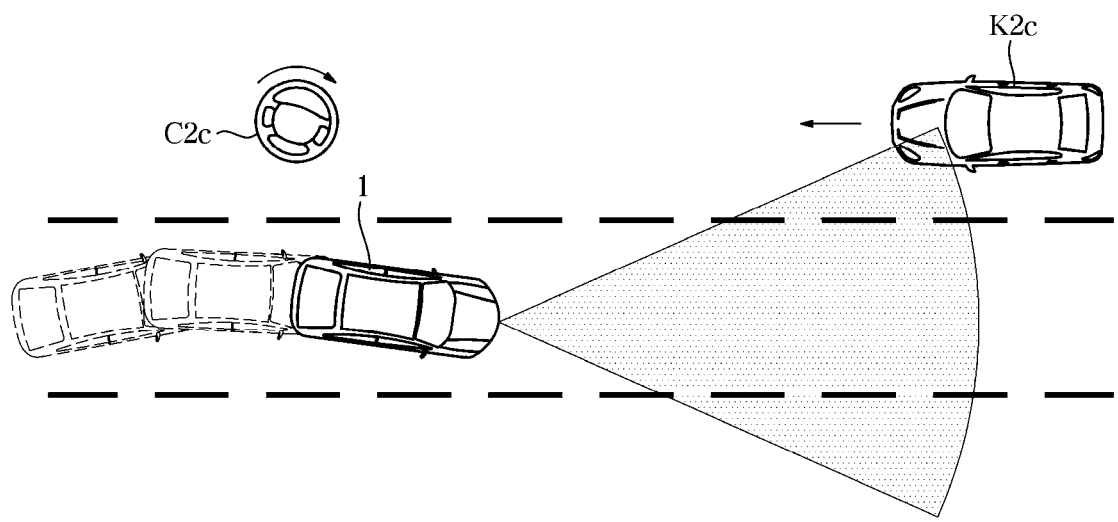

FIGS. 2A to 2C are views illustrating a positional relationship between a vehicle and a surrounding object positioned at a front side of the vehicle and a driving state of the vehicle according to an embodiment.

Referring to FIG. 2A, the vehicle 1 is illustrated as having a vehicle K2a positioned at a front side of the vehicle 1, as one of vehicle surrounding objects.

The vehicle 1 may have a preceding vehicle in front of the vehicle 1, and may perform emergency automatic braking on the preceding vehicle. The control unit 130 may determine that the accident occurrence probability is high on the basis of a positional relationship with the vehicle in front of the vehicle 1, together with driving state information indicating the vehicle 1 performs emergency automatic braking, and may therefore store the vehicle surrounding image in a high quality storage form having an increased number of frames per unit time to correspond to the high accident occurrence probability.

According to one embodiment, the control unit 130 may determine the storage form of the vehicle surrounding image on the basis of the relative speed of the vehicle 1 with respect to the preceding vehicle and the deceleration of the vehicle 1.

Referring to FIG. 2B, the vehicle 1 is illustrated as having another vehicle K2b at a front side of the vehicle 1 on an intersection, as one of the vehicle surrounding objects.

The vehicle 1 may have the opposite vehicle K2b positioned at a front side of the vehicle 1 in the intersection situation, and may perform emergency automatic braking on the vehicle K2b. The control unit 130 may determine that the accident occurrence probability is high on the basis of a positional relationship with the vehicle K2b in front of the vehicle 1, together with driving state information indicating the vehicle 1 performs emergency automatic braking, and may therefore store the vehicle surrounding image in a high quality storage form having an increased number of frames per unit time to correspond to the high accident occurrence probability.

According to one embodiment, the control unit 130 may determine the storage form of the vehicle surrounding image on the basis of the relative speed of the vehicle 1 with respect to the opposite vehicle, and the deceleration of the vehicle 1.

Referring to FIG. 2C, the vehicle 1 has another vehicle K2c that travels in a direction opposite to a direction in which the vehicle 1 travels, as one of the vehicle surrounding objects, and the vehicle 1 performs a steering control operation (C2c).

The vehicle 1 may have the opposite vehicle K2c positioned at a front side of the vehicle 1 and perform the operation (C2c) on the vehicle K2c in which the steering of the vehicle 1 is changed to avoid a collision with the vehicle K2c positioned in front of the vehicle 1. The control unit 130 may determine that the accident occurrence probability is high on the basis of the positional relationship between the vehicle 1 and the vehicle K2c approaching the vehicle 1 ahead, together with driving state information indicating the vehicle 1 performs the operation (C2c) of changing the steering, and may therefore store the vehicle surrounding image in a high quality storage form having an increased number of frames per unit time to correspond to the high accident occurrence probability.

According to one embodiment, the control unit 130 may determine the storage form of the vehicle surrounding image on the basis of the relative speed of the vehicle 1 with respect to the opposite vehicle, and the amount of change of the steering angle of the vehicle 1.

Meanwhile, in the above description of FIGS. 2A to 2C, the operation of determining the storage form of the vehicle surrounding image is illustrated as being based on the accident occurrence probability that is determined by the FCA that performs collision avoidance through emergency automatic braking and steering according to the environment of the neighboring vehicle. However, the operations shown in FIGS. 2A to 2C are merely exemplified for the purposes of describing the present disclosure, and the operation of determining an accident occurrence probability based on a situation in front of the vehicle is not limited thereto.

Figure 3A:
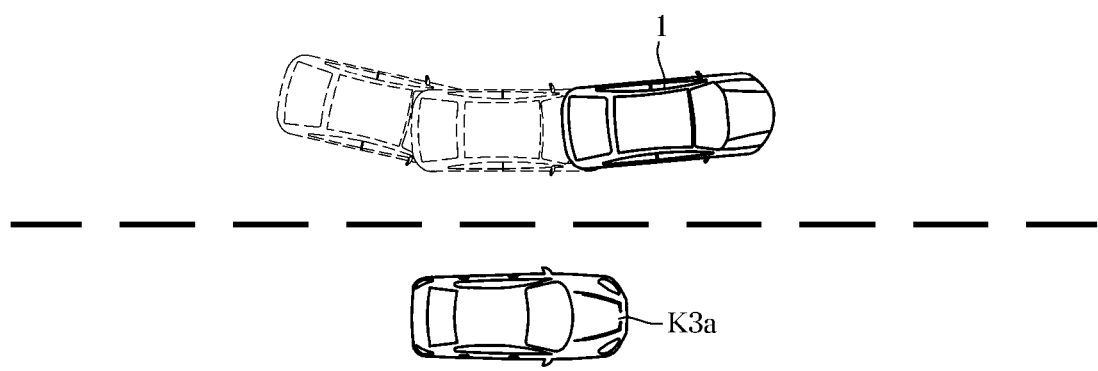
FIGS. 3A, 3B, and 3C are views illustrating a positional relationship between a vehicle and a surrounding object positioned at a lateral side of the vehicle and a driving state of the vehicle according to an embodiment.
Figure 3B:
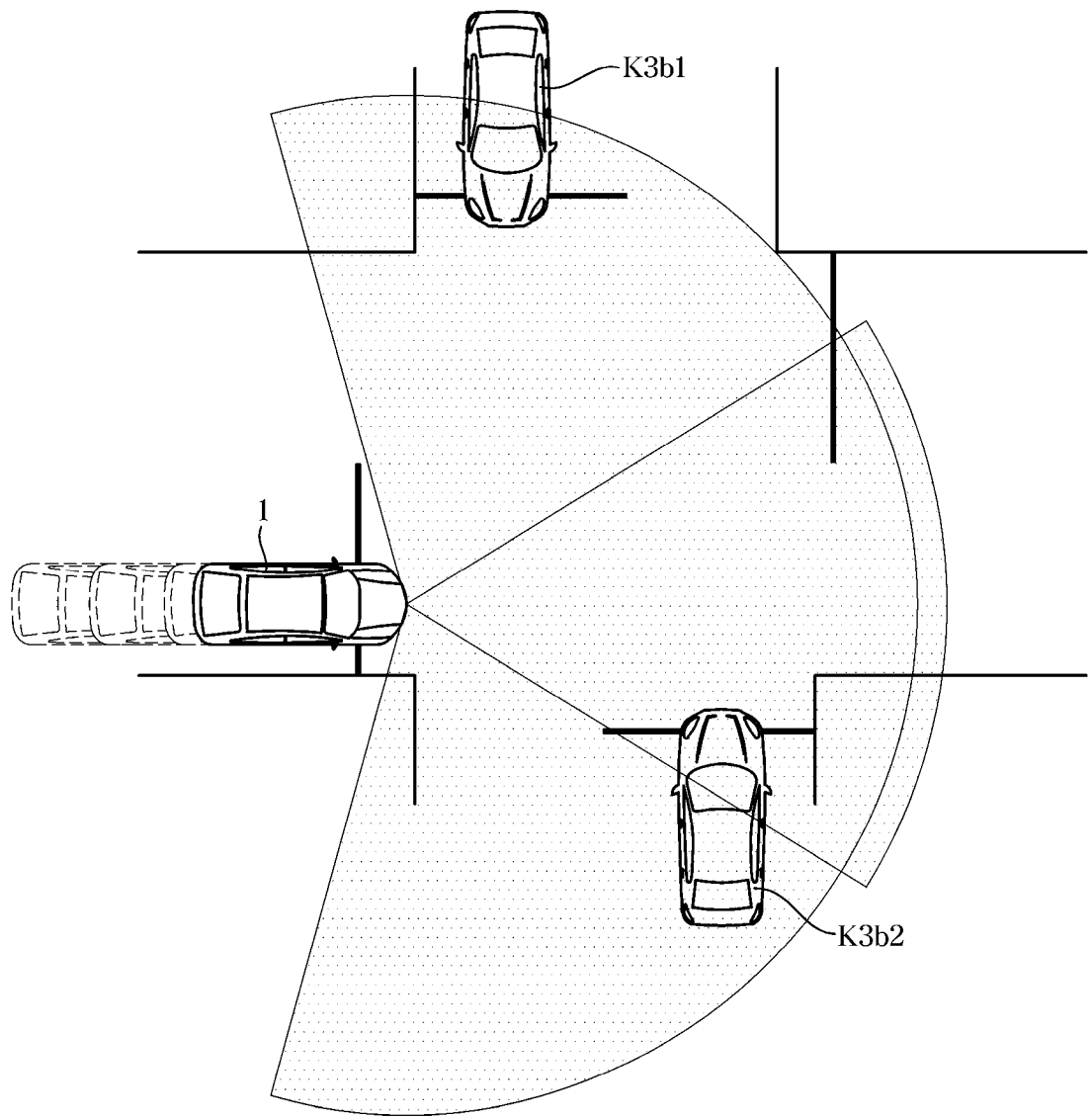
Figure 3C:
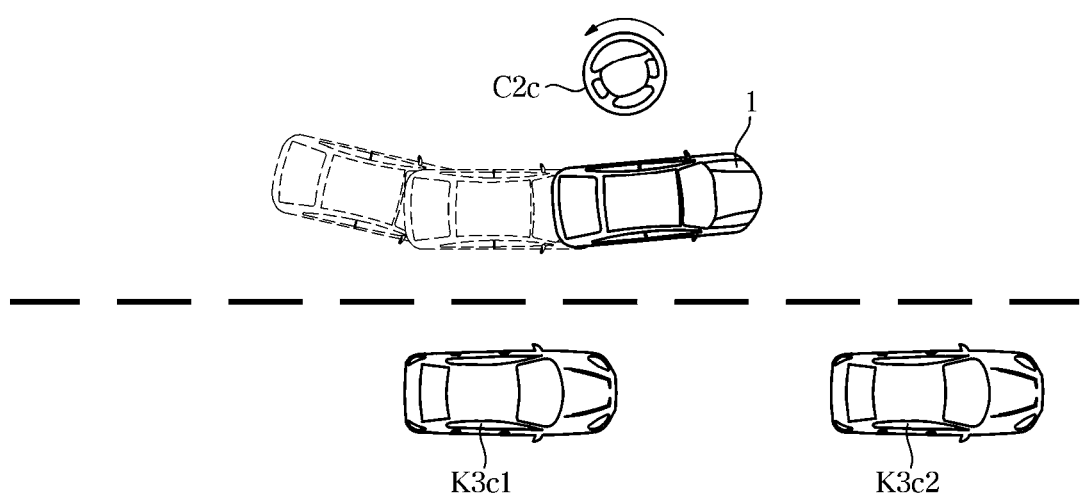

FIGS. 3A to 3C are views illustrating a positional relationship between a vehicle and a surrounding object located at a lateral side of the vehicle and a driving state of the vehicle according to an embodiment.

Referring to FIG. 3A, the vehicle 1 is illustrated as having another vehicle K3a positioned at a lateral side of the vehicle 1, as one of the vehicle surrounding objects.

The vehicle 1 may have the vehicle K3a positioned at the lateral side thereof, and perform an operation of avoiding a collision by performing braking or change in the steering angle in association with the vehicle K3a positioned at the lateral side thereof. The control unit 130 may determine that the accident occurrence probability is high on the basis of a positional relationship with the vehicle K3a positioned at the lateral side thereof, together with driving state information indicating the vehicle 1 performs braking and change of steering angle, and may therefore store the vehicle surrounding image in a high quality storage form having an increased number of frames per unit time to correspond to the high accident occurrence probability.

According to one embodiment, the control unit 130 may determine the storage form of the vehicle surrounding image on the basis of the relative speed of the vehicle 1 with respect to the lateral side vehicle, the deceleration of the vehicle 1, and the change of the steering angle of the vehicle 1.

Referring to FIG. 3B, the vehicle 1 is illustrated as having other vehicles K3$b$1 and K3$b$2 positioned at lateral sides thereof on an intersection, as ones of the vehicle surrounding objects.

The vehicle 1 may have the vehicles K3$b$1 and K3$b$2 positioned at the lateral sides thereof in the intersection situation, and may perform emergency automatic braking in association with the vehicles K3$b$1 and K3$b$2 positioned at the lateral sides thereof. The control unit 130 may determine that the accident occurrence probability is high on the basis of positional relationships of the vehicle 1 with the vehicles K3$b$1 and K3$b$2 positioned at the lateral sides thereof, together with driving state information indicating the vehicle 1 performs emergency automatic braking, and may therefore store the vehicle surrounding image in a high quality storage form having an increased number of frames per unit time to correspond to the high accident occurrence probability.

According to one embodiment, the control unit 130 may determine the storage form of the vehicle surrounding image on the basis of the relative speed of the vehicle 1 with respect to the vehicles K3$b$1 and K3$b$2 positioned at the lateral sides thereof and the deceleration of the vehicle 1.

Referring to FIG. 3C, the vehicle 1 has other vehicles K3$c$1 and K3$c$2 that travel at a lateral side of the vehicle 1, as ones of the vehicle surrounding objects, and the vehicle 1 performs a steering control operation (C2$c$).

The vehicle 1 may have the vehicles K3$c$1 and K3$c$2 positioned at the lateral side thereof and perform the operation (C2$c$) on the vehicles K3$c$1 and K3$c$2 in which the steering of the vehicle 1 is changed to avoid a collision with the vehicles K3$c$1 and K3$c$2 positioned at the lateral sides of the vehicle 1. The control unit 130 may determine that the accident occurrence probability is high on the basis of the positional relationships of the vehicle 1 with the vehicles K3$c$1 and K3$c$2 positioned at the lateral side of the vehicle 1, together with driving state information indicating the vehicle 1 performs the steering change operation (C2$c$), and may therefore store the vehicle surrounding image in a high quality storage form having an increased number of frames per unit time to correspond to the high accident occurrence probability.

According to one embodiment, the control unit 130 may determine the storage form of the vehicle surrounding image on the basis of the relative speed of the vehicle 1 with respect to the vehicles positioned at the lateral side of the vehicle 1 and the amount of change of the steering angle of the vehicle 1.

Meanwhile, in the operations described with reference to FIGS. 3A to 3C, upon occurrence of a situation to avoid a collision through emergency automatic braking or steering a blind spot detect (BSD), the corresponding range is determined to have a high risk of collision, and data storage is performed by storing rear lateral side images to be different in quality.

In addition, the operations described with reference to FIGS. 3A to 3C are merely exemplified for the purposes of describing the present disclosure, and the operation of determining an accident occurrence probability on the basis of a situation of a lateral side and a rear side of the vehicle is not limited.

Meanwhile, in the operations described with references to FIGS. 2A to 3C, the control process may be initiated in the travelling of the vehicle 1, and the accident occurrence probability may be calculated through vehicle information acquisition and vehicle surrounding object recognition. The control unit 130 may apply differential storage forms to the storage unit 140 on the basis of the accident occurrence probability. When the accident occurrence probability is low, the vehicle surrounding image is assigned a low frame rate or low bit rate and a low resolution to thereby reduce the size of the vehicle surrounding image to be stored. When the accident occurrence probability is high, the vehicle surrounding image is assigned a high frame rate or high bit rate and a high resolution to thereby increase the size of the vehicle surrounding image to be stored.

Figure 4A:
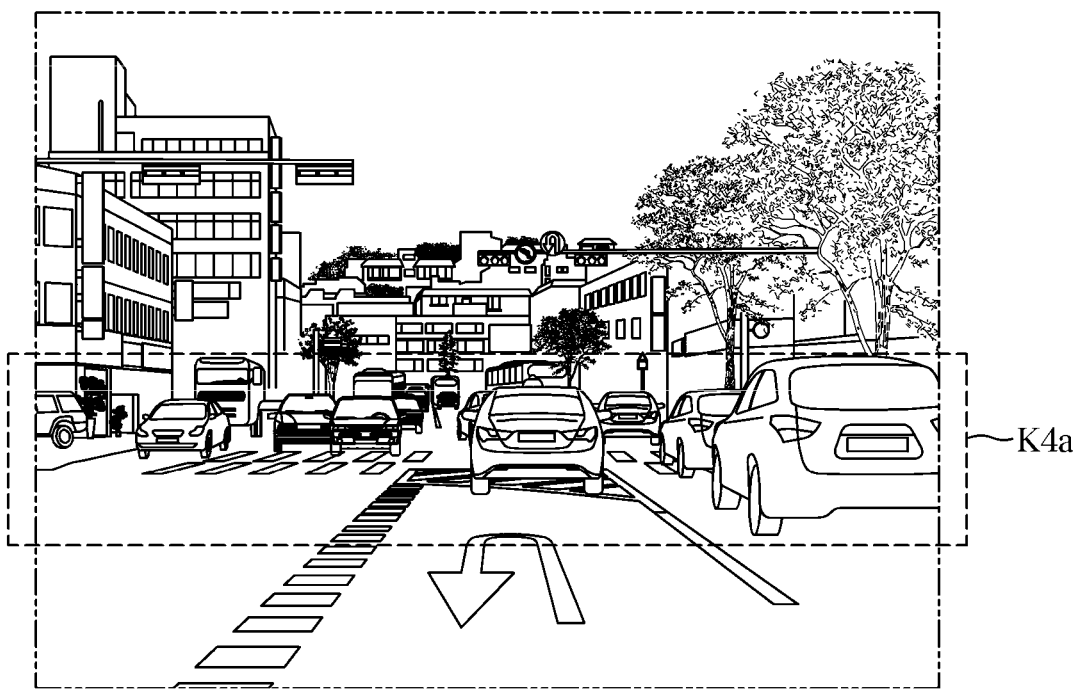
FIGS. 4A, 4B, and 4C are views for describing an operation of calculating a complexity of a vehicle surrounding image according to an embodiment.
Figure 4B:
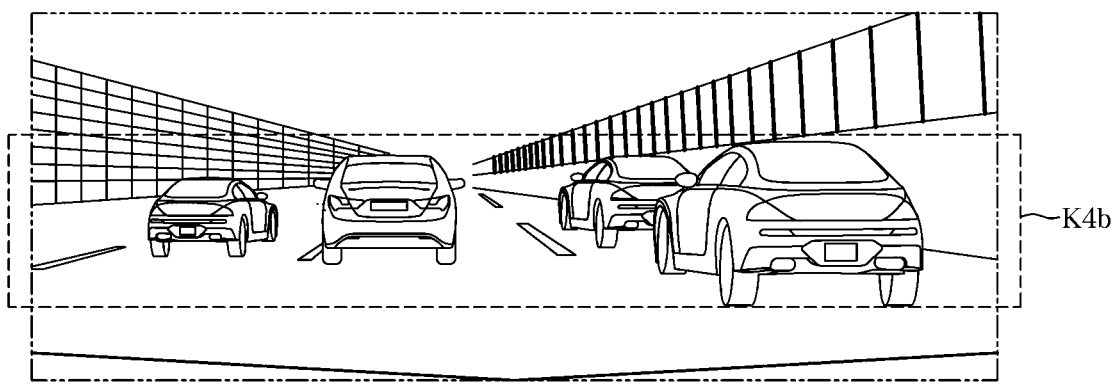
Figure 4C:
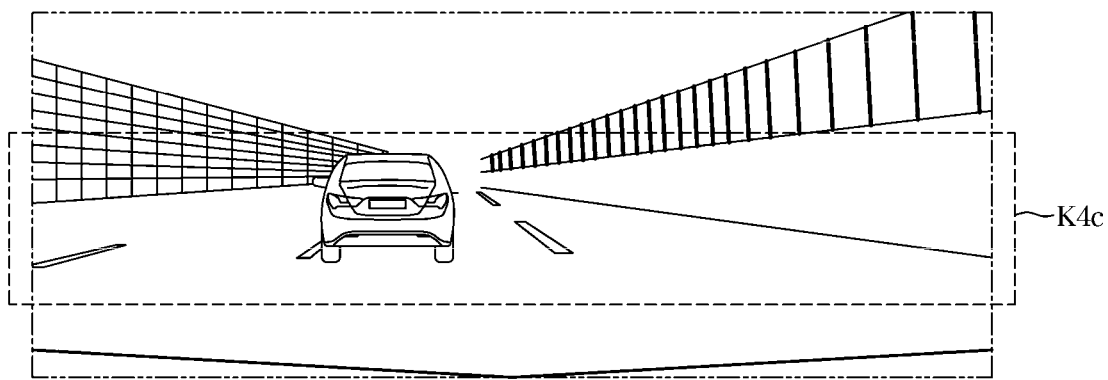

FIGS. 4A to 4C are views for describing an operation of calculating a complexity of a vehicle surrounding image according to an embodiment.

Referring to FIG. 4A, a situation having a high complexity is illustrated.

The control unit 130 may determine the complexity of a vehicle surrounding image on the basis of at least one object K4$a$ included in the vehicle surrounding image, and determine the accident occurrence probability of the vehicle 1 on the basis of the complexity of the surrounding image.

Meanwhile, since a large number of vehicles and surrounding objects are shown FIG. 4A, pixels per unit area may be variously distributed. Accordingly, the control unit 130 may determine that the surrounding image of the vehicle 1 has a high complexity from the surrounding situation of the vehicle shown in FIG. 4A, and may determine the accident occurrence probability on the basis of the determined complexity.

When a vehicle surrounding image has a high complexity, the accident occurrence probability may increase. However, the control unit 130 may determine the accident occurrence probability by aggregating the positional relation of the vehicle with respect to the surrounding object and the driving state information as described above.

Referring to FIG. 4B, a situation having an intermediate complexity is illustrated.

The control unit 130 may determine the complexity of a vehicle surrounding image on the basis of at least one object K4$b$ included in the vehicle surrounding image, and determine the accident occurrence probability of the vehicle 1 on the basis of the determined complexity of the surrounding image.

Meanwhile, since general vehicles exist in FIG. 4B, pixels may be distributed in a limited range compared to FIG. 4A. Accordingly, the control unit 130 may determine that the surrounding image of the vehicle 1 has an intermediate complexity from the surrounding situation of the vehicle shown in FIG. 4B, and may therefore determine the accident occurrence probability on the basis of the determined complexity.

When a vehicle surrounding image has a high complexity, the accident occurrence probability may increase. However, the control unit 130 may determine the accident occurrence probability by aggregating the positional relation of the vehicle with respect to the surrounding object and the driving state information as described above.

In other words, the vehicle surrounding image shown in FIG. 4B has a complexity lower than that of FIG. 4A, but may have a traveling speed or a change in steering angle greater than those of the vehicle surrounding image shown in FIG. 4A. Accordingly, the control unit 130 may determine the accident occurrence probability by further considering such driving state information together with the complexity.

Referring to FIG. 4C, a situation having a low complexity is illustrated.

The control unit 130 may determine the complexity of a vehicle surrounding image on the basis of at least one object K4c included in the vehicle surrounding image, and determine the accident occurrence probability of the vehicle 1 on the basis of the determined complexity of the surrounding image.

Meanwhile, since only a single vehicle exists in FIG. 4C, pixels may be distributed in a limited range compared to FIGS. 4A and 4B. Accordingly, the control unit 130 may determine that the surrounding image of the vehicle 1 has a low complexity from the surrounding situation of the vehicle shown in FIG. 4C, and may therefore determine the accident occurrence probability on the basis of the determined complexity.

When a vehicle surrounding image has a high complexity, the accident occurrence probability may increase. However, the control unit 130 may determine the accident occurrence probability by aggregating the positional relation of the vehicle with respect to the surrounding object and the driving state information as described above.

In other words, the vehicle surrounding image shown in FIG. 4C has a complexity lower than those of FIGS. 4A and 4B, but may have a traveling speed and a change in steering angle greater than those of the vehicle surrounding image shown in FIGS. 4A and 4B. Accordingly, the control unit 130 may determine the accident occurrence probability by further considering such driving state information together with the complexity.

Referring to FIGS. 4A to 4C, when various types of vehicles exist in a city as shown in FIG. 4A, the control unit 130 may determine that the vehicle surrounding image has a high complexity. Meanwhile, in a quiet highway, the amount of information to be stored may be small. In addition, according to one embodiment, data complexity may be determined through sensor fusion data.

The operations described with reference to FIGS. 4A to 4C are merely exemplified for the purposes of describing the complexity of the surroundings of the vehicle according to the present disclosure, and the operation of determining the complexity of the vehicle surrounding image is not limited thereto.

Figure 5:
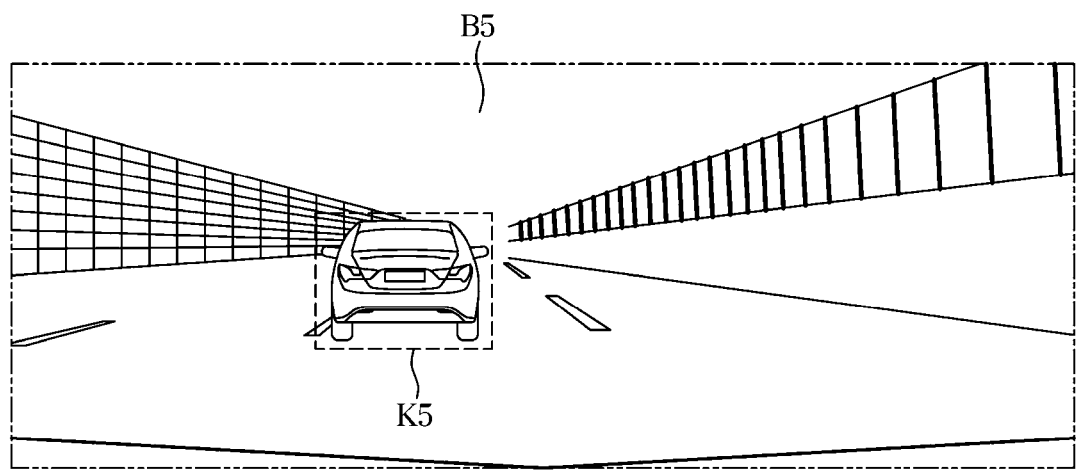
FIG. 5 is a view for describing an operation of storing an image by identifying a terrain area in which a vehicle travels from a surrounding image.

FIG. 5 is a view for describing an operation of storing an image by identifying a terrain area in which a vehicle travels from a surrounding image.

Referring to FIG. 5, the control unit 130 may identify a terrain area B5 from an acquired vehicle surrounding image. The control unit 130 may store the vehicle surrounding image such that the terrain area B5 is segmented from a vehicle surrounding object K5.

In detail, since the vehicle surrounding object K5 is closely related to an accident occurrence situation of the vehicle 1, the vehicle surrounding image corresponding to the vehicle surrounding object K5 may be stored in a storage form having a large number of frames per unit time and a high-resolution in the storage unit 140.

According to one embodiment, the control unit 130 may determine a road on which the vehicle 1 travels as the terrain area B5, and since the terrain area B5 is not determined easy to be directly related to an accident occurrence of the vehicle, the control unit 130 may store the vehicle surrounding image corresponding to the terrain area B5 in a storage form having a small number of frames per unit time and a low-resolution in the storage unit 140. In addition, the terrain areas B5 may be stored in different storage forms on the basis of the complexity in a stepwise or sequential manner.

Figure 6:
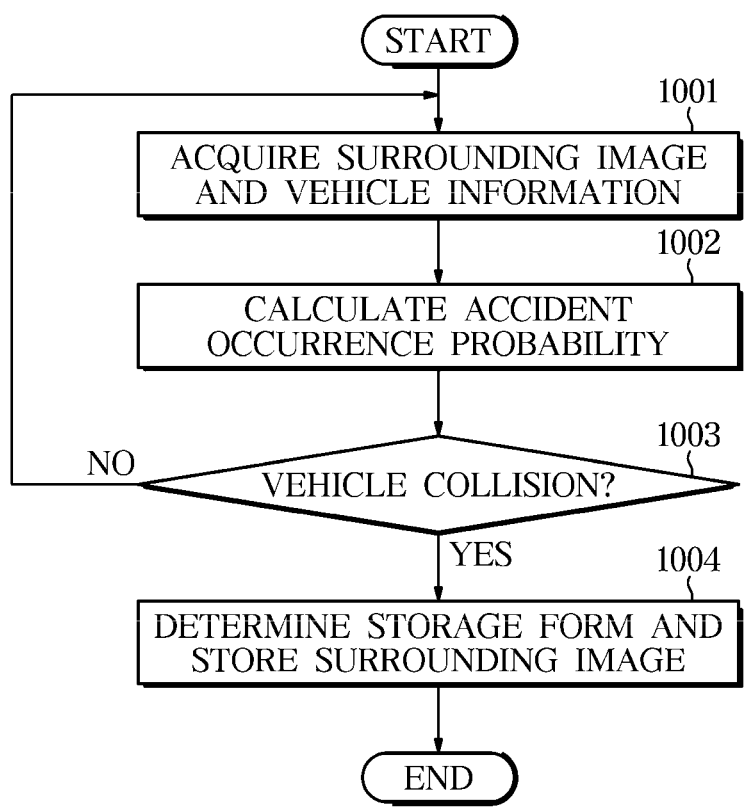
FIG. 6 is a flowchart according to an embodiment.

FIG. 6 is a flowchart according to an embodiment.

Referring to FIG. 6, the vehicle 1 may acquire a surrounding image and vehicle information on the basis of information acquired by the sensor unit 120 and the camera 110 (1001). The vehicle 1 may calculate an accident occurrence probability (1002). Meanwhile, the calculating of the accident occurrence probability may include considering the positional relationship between the vehicle and the surrounding object, the driving state information of the vehicle, and the complexity of the surrounding image.

When it is determined that a collision accident has occurred to the vehicle 1 (1003), a storage form may be determined and the vehicle surrounding image may be stored (1004).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle and the control method thereof can efficiently manage a storage medium by storing images acquired by the vehicle to be different in quality on the basis of a surrounding environment of the vehicle and a vehicle state and a control method thereof.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

The invention claimed is:

1. A vehicle comprising:
   a storage unit;
   a camera configured to acquire a vehicle surrounding image of a vehicle;
   a sensor unit configured to acquire vehicle information of the vehicle; and
   a control unit configured to determine an accident occurrence probability of the vehicle on the basis of at least one of the vehicle surrounding image and the vehicle information, and in response to determining that a collision has occurred to the vehicle on the basis of the vehicle information, determine a storage form of the vehicle surrounding image on the basis of the accident occurrence probability and store the vehicle surrounding image in the storage unit;
   wherein the control unit is configured to:
   identify a terrain area in which the vehicle travels in the vehicle surrounding image to segment a vehicle surrounding object from the terrain area; and
   store a part of the vehicle surrounding image corresponding to an area of the vehicle surrounding the object and a part of the vehicle surrounding image corresponding to the terrain area to be different in storage forms in the storage unit.

2. The vehicle of claim 1, wherein the control unit is configured to:
   determine a positional relation between the vehicle and a surrounding object of the vehicle on the basis of the vehicle information; and
   determine the accident occurrence probability of the vehicle on the basis of the positional relationship.

3. The vehicle of claim 1, wherein the control unit is configured to:
   determine driving state information of the vehicle on the basis of the vehicle information; and
   determine the accident occurrence probability of the vehicle on the basis of the driving state information.

4. The vehicle of claim 1, wherein the control unit is configured to:
   determine a complexity of the vehicle surrounding image on the basis of at least one object included in the vehicle surrounding image; and
   determine the accident occurrence probability of the vehicle on the basis of the complexity of the vehicle surrounding image.

5. The vehicle of claim 1, wherein the control unit is configured to:
   determine a complexity of the terrain area on the basis of a pixel distribution per unit area included in the part of the vehicle surrounding image corresponding to the terrain area; and
   determine a storage form of the part of the vehicle surrounding image corresponding to the terrain area on the basis of the complexity of the terrain area.

6. The vehicle of claim 1, wherein the control unit is configured to:
   store the vehicle surrounding image in the storage form that is determined by a number of frames per unit time in proportion to the accident occurrence probability.

7. A method of controlling a vehicle, the method comprising:
   acquiring a vehicle surrounding image of a vehicle;
   acquiring vehicle information;
   determining an accident occurrence probability of the vehicle on the basis of at least one of the vehicle surrounding image and the vehicle information;
   in response to determining that a collision has occurred to the vehicle on the basis of the vehicle information, determining a storage form of the vehicle surrounding image on the basis of the accident occurrence probability of the vehicle, and storing the vehicle surrounding image in a storage unit;
   identifying a terrain area in which the vehicle travels in the vehicle surrounding image to segment a vehicle surrounding object from the terrain area; and
   storing a part of the vehicle surrounding image corresponding to an area of the vehicle surrounding object and a part of the vehicle surrounding image corresponding to the terrain area to be different in storage forms in the storage unit.

8. The method of claim 7, wherein the determining of the accident occurrence probability of the vehicle includes:
   determining a positional relation between the vehicle and a surrounding object of the vehicle on the basis of the vehicle information; and
   determining the accident occurrence probability of the vehicle on the basis of the positional relationship.

9. The method of claim 7, wherein the determining of the accident occurrence probability of the vehicle includes:
   determining driving state information of the vehicle on the basis of the vehicle information; and
   determining the accident occurrence probability of the vehicle on the basis of the driving state information.

10. The method of claim 7, wherein the determining of the accident occurrence probability of the vehicle includes:
    determining a complexity of the vehicle surrounding image on the basis of at least one object included in the vehicle surrounding image; and
    determining the accident occurrence probability of the vehicle on the basis of the complexity of the vehicle surrounding image.

11. The method of claim 7, wherein the storing of the part of the vehicle surrounding image corresponding to the terrain area includes:
    determining a complexity of the terrain area on the basis of a pixel distribution per unit area included in the part of the vehicle surrounding image corresponding to the terrain area; and
    determining a storage form of the part of the vehicle surrounding image corresponding to the terrain area on the basis of the complexity of the terrain area.

12. The method of claim 7, wherein the determining of the storage form of the vehicle surrounding image and storing the vehicle surrounding image in the storage unit includes:
    storing the vehicle surrounding image in the storage form that is determined by a number of frames per unit time in proportion to the accident occurrence probability.

* * * * *